April 7, 1959   D. H. NEWCOMB   2,880,747
AIR UNDER PRESSURE DISTRIBUTOR
Filed Nov. 8, 1954
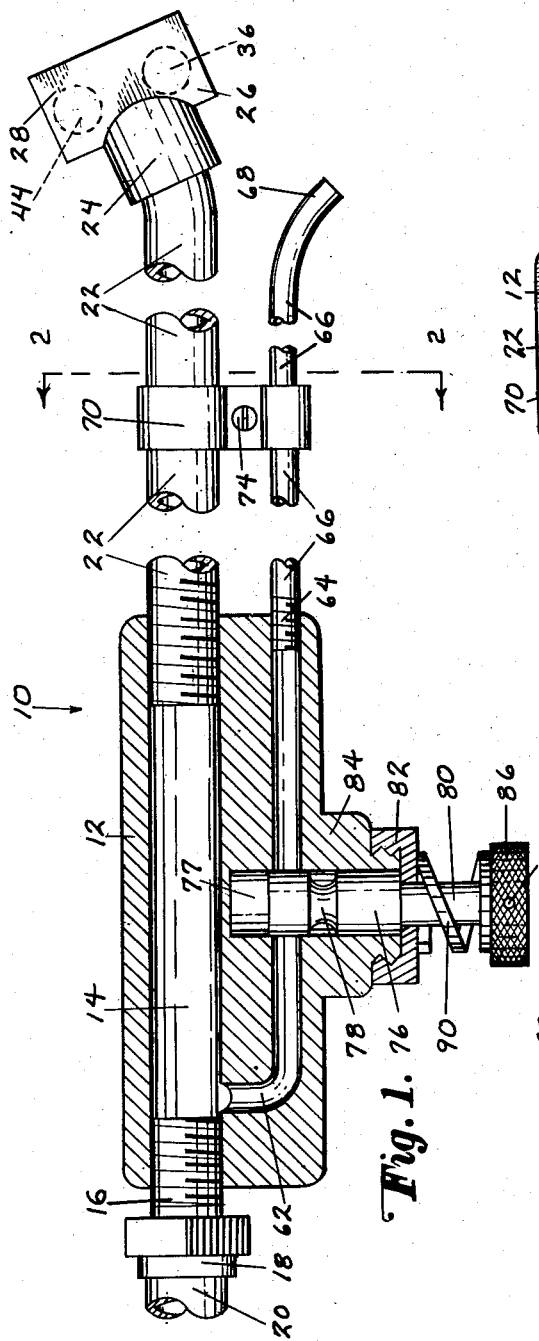
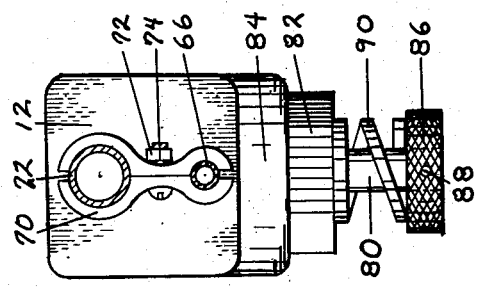
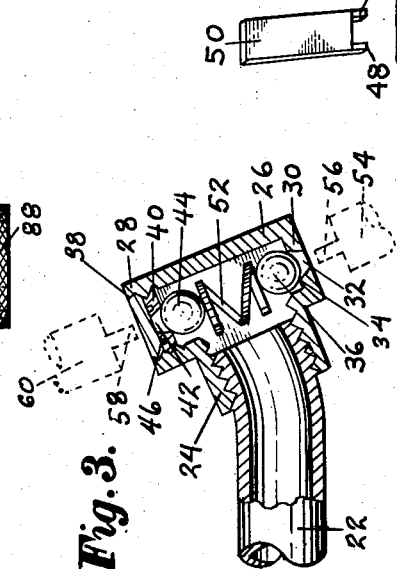
INVENTOR.
D. H. Newcomb
BY Arthur H. Sturges
Attorney

United States Patent Office 2,880,747
Patented Apr. 7, 1959

2,880,747

AIR UNDER PRESSURE DISTRIBUTOR

Duane H. Newcomb, Sioux Falls, S. Dak.

Application November 8, 1954, Serial No. 467,425

1 Claim. (Cl. 137—223)

The instant invention relates to devices which employ air under pressure and more particularly to devices used for certain cleaning purposes and for inflating pneumatic tires.

It is an object of the invention to provide a device having outlets for air under pressure which are disposed closely adjacent to each other for use in removing debris from the ends of the stems of the inner tubes of pneumatic tires at times when the caps for said ends have been lost therefrom and for use in inflating juxtapositioned tires mounted on an axle common to both tires of a truck or tractor for a trailer towed by the tractor in an expeditious economical manner.

Another object of the invention is to provide an assembly of parts which are in communication, at desired times, with a source of supply of air under pressure through a flexible hose, the arrangement of said parts being such that the operator may employ the device for inflating pneumatic tires at desired times and, by manipulating a switch valve, may divert the air under pressure to and through a separate outlet nozzle for valve stem cleaning purposes and the like.

Other and further objects and advantages of the invention will be understood from the following detailed description thereof.

In the drawings:

Figure 1 is a side elevation of the new device, certain portions thereof being broken away and others depicted in longitudinal section.

Figure 2 is a transverse section, the view being taken substantially on line 2—2 of Figure 1.

Figure 3 is an enlarged detail illustrating a tire inflating valve-tool employed, said tool being shown in section, together with a portion of a pipe employed.

Figure 4 is a side elevation of a wrench preferably employed.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

It is well known that the dual tires which are mounted side by side on an axle of a truck or tractor for a trailer are provided with valve stems through which air under pressure may be introduced into the tubes within said tires; that the valve stem of the outer tire is readily accessible and that the valve stem of the inwardly disposed tire is not readily accessible whereby manufacturers of said stems provide the inwardly disposed tire with an elongated curved stem which extends through a hole provided through the disc of the outer wheel of the outer tire whereby the inwardly disposed tire may be inflated at times when the operator is standing adjacent and to one side of and at the outer side of the outside tire.

It is also further well known that it often happens that the valve stems of the inner tubes of the tires come in contact with dust and debris, mud and the like, particularly at times when the valve caps of said stems become lost and particularly during operation of dual tired trucks, and the instant invention aims to provide a device inflating tires having a cooperative cleaning mechanism for removing debris from the said valve stems prior to for inflating tires having a cooperative cleaning mechanism valves within said stems become properly seated for preventing a loss of air outwardly through said stems during operation and traveling movements of a vehicle.

As heretofore practiced, gasoline filling stations have been provided with an air under pressure hose line to the terminal end of which a device is attached for tire inflating purposes and at times when an operator desires to use the hose for cleaning purposes he detaches the inflating tool from the hose line and substitutes a cleaning tool therefor whereby an appreciable amount of time and labor is lost during a substitution of the one tool for the other as needed, and the instant invention aims to obviate the undesirable features of the prior practice.

In the accompanying drawings, and in the following specification, the same reference characters are used to designate the same parts and elements throughout and in which the numeral 10 refers to the invention in its entirety, and 12 indicates a valve cage.

The valve body or cage 12 is provided with an elongated bore 14, the annular wall of which is provided with screw threads at each end thereof.

To the intake end of the bore 14 a nipple 16 is threadedly attached. A hose coupling is indicated at 18 which is threadedly attached to the adjacent end of the nipple 16. The coupling 18 is secured to a hose 20 of any suitable length. The other end of the hose is in communication with a source of supply of air under pressure.

A suitable length of pipe 22 is threadedly connected to the other end of the bore 14. That end of the pipe 22 which is opposite to the threaded connection of said pipe with the valve cage is provided with a T 24 threadedly connected to said pipe at the free curved end of the pipe as best shown in Figure 3.

The T or T-shaped valve head 24 is provided with oppositely disposed arms 26 and 28. The arm 26 is provided with a closed end 30 through which an aperture 32 is provided, said aperture providing a valve seat 34 on the inner surface thereof for cooperation with a ball valve 36. The ball 36 normally maintains the aperture 32 closed.

The arm 28 of the T is provided with an internal annular screw thread 38 for engagement with a threaded disc 40. The disc is provided with a medial aperture 42, the inner wall of which provides a valve seat for a further ball 44 employed.

The disc 40 is provided with two oppositely disposed recesses 46. The recesses receive the spaced tangs 48 therein of a wrench 50 which may be employed for moving the disc further inwardly or further outwardly with respect to the thread 38 of the arm 28 and for governing the tension of a spring member 52.

The spring is disposed between the balls 36 and 44 for normally urging them towards their respective valve seats, said arrangement of balls and valve seats being employed for purposes later described in connection with the inflating-valve-tool described.

Referring to Figure 3 the valve stem of a pneumatic tire-tube is indicated at 54, having a conventional needle 56 which projects through said stem as represented by broken lines in Fig. 3. The valve stem is in communication with the interior of a tube carried by the tire of a vehicle, said tire being mounted on a wheel of said vehicle. As thus described it will be understood that at times when the operator causes the needle 56 to be disposed through the aperture 32 and against the ball 36 that by manipulation the ball becomes moved away from its seat and against the urge of the spring 52 for permitting air under pressure to inflate the inner tube of said tire. Similarly, by moving the ball 44 into contact with the pin 58 of the adjacent valve stem 60 of said juxtaposed tire the inner tube of the inwardly disposed tire may be inflated.

The air under pressure hose line 20 is provided with a cut-off valve, not shown, which is opened for permitting air under pressure to enter the bore 14 of the cage 12 and pipe 22.

The valve cage 12 is provided with a by-pass conduit or passage 62 which is in communication with the bore 14 as shown in Figure 1.

The terminal end of the by-pass is threadedly attached, as at 64, to a nozzle or pipe 66 having a terminal arcuate end portion 68 which is preferably curved away from the T 24 as shown in Figure 1. A two-piece clamp 70 is provided having semicircular end portions which respectively engage the pipes 22 and 66 at times when the nut 72 of a bolt 74 is seated, as shown in Figure 2, for maintaining the outlet end of the nozzle close to the valve-tool.

A slidable plunger 76 is disposed in a transversely disposed bore or recess 77 of the valve cage 12. The recess is disposed at a right angle with respect to the by-pass conduit 62. The plunger 76 is provided with an annular kerf or recess 78 which is normally disposed out of alignment with the conduit 62. A restricted portion 80 of the plunger extends through a nut 82 which is threadedly secured to a bushing 84 of the valve cage. The outer end of the plunger is provided with a head or button 86 secured thereto by any suitable means such as the pin or keeper 88. Between the head 86 and the nut or cap 82 a spring 90 is provided for urging the plunger to its normal closed position, shown in Figure 1.

At desired times the operator may place his thumb or hand on the head 86 for causing the kerf 78 to align with the by-pass conduit 62 for permitting air under pressure to flow outwardly of the terminal end 68 of the pipe 66 for various uses of said air.

*Operation*

During operation and at times when the end of a valve stem of a tube is clogged with debris the operator removes the latter from said stem by causing a blast of air under pressure to be directed toward and about the end of the clogged valve stem by manipulating the device to permit air under pressure to flow outwardly of the nozzle 68 of the pipe 66 and prior to inflating a tire through the valve stem cleaned by the above described cooperative means.

From the foregoing specification, it will become apparent that the invention disclosed will adequately accomplish the functions for which it has been designed and in an economical manner and that its simplicity, accuracy and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape, size and rearrangement of details and parts such as come within the purview of the invention claimed may be resorted to, in actual practice, if desired.

I claim:

In a tube inflating valve assembly, the combination which comprises an elongated valve body rectangular-shaped in cross section, having a continuous longitudinally disposed bore, the ends of which are threaded, in one side and a passage, the diameter of which is less than that of the bore parallel to the bore and providing a by-pass in the opposite side, the body having a cross connection between the bore and an inner end of the passage and also having a transversely disposed bore extended through and intercepting the passage, the valve body also having a threaded nipple extended from one side and the transversely disposed bore being positioned to extend through the nipple, a cap threaded on the nipple, the cap having an opening therein, a cylindrical plunger having an annular recess therein and also having a stem extended from one end, the stem being positioned in the opening of the cap and the annular recess being positioned to register with the passage through the body, the outer end of the stem having a head thereon and the outer portion of the stem being of a smaller diameter than that of the plunger providing a shoulder, the shoulder of the plunger being positioned to engage the inner surface of the cap to limit outward movement of the plunger, a spring extended around the stem and positioned between the head of the stem and the cap for urging the plunger outwardly to maintain the annular recess out of registry with the passage, an elongated tube having a T-shaped valve head providing laterally disposed arms and a stem end threaded in the end of the bore of the valve body opposite to the end in which the cross connection is positioned, valve seats in the ends of the laterally disposed arms, balls positioned to coact with the valve seats, a spring between the balls positioned to urge the balls against the valve seats, an elongated tube providing a nozzle extended from the passage through the body and also positioned on the end of the valve body from which the tube with the T-shaped head thereon extends, and a nipple threaded in the end of the bore opposite to the end from which the tube with the T-shaped valve head thereon extends for connecting the valve assembly to a source of air under pressure.

References Cited in the file of this patent

UNITED STATES PATENTS

| | | |
|---|---|---|
| 1,598,615 | Marsh | Sept. 7, 1926 |
| 2,181,653 | Clauder | Nov. 28, 1939 |
| 2,344,492 | Brubaker | Mar. 21, 1944 |
| 2,716,998 | Knasko | Sept. 6, 1955 |

FOREIGN PATENTS

| | | |
|---|---|---|
| 475,891 | Great Britain | Nov. 29, 1937 |